(12) United States Patent
Siesjö et al.

(10) Patent No.: US 11,091,239 B2
(45) Date of Patent: Aug. 17, 2021

(54) SYSTEM FOR MONITORING A REMOTE UNDERWATER LOCATION

(71) Applicant: Saab Seaeye Limited, Fareham (GB)

(72) Inventors: Jan Siesjö, Ljungsbro (SE); Jon Mortimer Robertson, Fareham (GB)

(73) Assignee: SAAB SEAEYE LIMITED, Hampshire (GB)

( * ) Notice: Subject to any disclaimer, the term of this patent is extended or adjusted under 35 U.S.C. 154(b) by 0 days.

(21) Appl. No.: 15/023,818

(22) PCT Filed: Sep. 19, 2014

(86) PCT No.: PCT/GB2014/052860
§ 371 (c)(1),
(2) Date: Mar. 22, 2016

(87) PCT Pub. No.: WO2015/040418
PCT Pub. Date: Mar. 26, 2015

(65) Prior Publication Data
US 2016/0236760 A1 Aug. 18, 2016

(30) Foreign Application Priority Data
Sep. 23, 2013 (GB) .................................... 1316919

(51) Int. Cl.
*B63G 8/38* (2006.01)
*B63G 8/00* (2006.01)
(Continued)

(52) U.S. Cl.
CPC .............. *B63G 8/001* (2013.01); *B63C 11/52* (2013.01); *B63G 8/42* (2013.01); *G01S 3/808* (2013.01);
(Continued)

(58) Field of Classification Search
CPC .............. B63G 8/001; B63G 2008/002; B63G 2008/005; B63G 2008/007;
(Continued)

(56) References Cited

U.S. PATENT DOCUMENTS 5,452,507 A 9/1995 Brunner et al.
2009/0067289 A1* 3/2009 Lee .......................... G01S 15/74
367/87

(Continued)

FOREIGN PATENT DOCUMENTS

JP 57196309 A * 12/1982 ............... B63G 7/02
WO 8503269 A1 8/1985

OTHER PUBLICATIONS

PCT International Search Report and Written Opinion dated Jan. 5, 2015 for Intl. App. No. PCT/GB2014/052860, from which the instant application is based, 11 pgs.

*Primary Examiner* — Andrew Polay
(74) *Attorney, Agent, or Firm* — Fredrikson & Byron, P.A.

(57) ABSTRACT

A system for monitoring a remote underwater location using an unmanned underwater vessel (5). The system includes an unmanned surface vessel (8), a communication unit (7) for submerged location and connected to the unmanned surface vessel (8) and in which the unmanned surface vessel has a position tracking control system for controlling the position of that vessel on a body of water and relative to the unmanned underwater vehicle (5). The communication unit (7) has a first wireless communication arrangement for communication with the unmanned underwater vehicle, a second wired communication arrangement (10) for communication with the unmanned surface vessel and the unmanned surface vessel has a third communication arrangement for communication with an operator or observer (1) remote from the unmanned surface vessel and
(Continued)

the unmanned underwater vehicle. The three communication arrangements are arranged in series such that, in use, the operator or observer may communication with the unmanned/autonomous underwater vehicle via the unmanned surface vessel, the wired connection between the unmanned surface vessel and the communication unit, and the wireless connection between the communication unit and the unmanned underwater vehicle.

24 Claims, 1 Drawing Sheet

(51) Int. Cl.
*B63C 11/52* (2006.01)
*B63G 8/42* (2006.01)
*G01S 3/808* (2006.01)
*H04B 10/50* (2013.01)
*H04B 10/80* (2013.01)
*B63B 35/03* (2006.01)

(52) U.S. Cl.
CPC ............ H04B 10/503 (2013.01); H04B 10/80 (2013.01); *B63B 35/03* (2013.01); *B63B 2203/00* (2013.01); *B63B 2211/02* (2013.01); *B63G 2008/005* (2013.01); *B63G 2008/007* (2013.01)

(58) Field of Classification Search
CPC ................ B63G 2008/008; B63G 8/39; B63G 2035/006; B63C 11/26
See application file for complete search history.

(56) References Cited

U.S. PATENT DOCUMENTS

| | | | |
|---|---|---|---|
| 2009/0114140 A1* | 5/2009 | Guerrero ................. | B63C 11/52 114/321 |
| 2009/0141591 A1* | 6/2009 | Basilico .................... | G01S 1/72 367/128 |
| 2012/0063262 A1* | 3/2012 | Imran ..................... | F03B 13/20 367/3 |

* cited by examiner

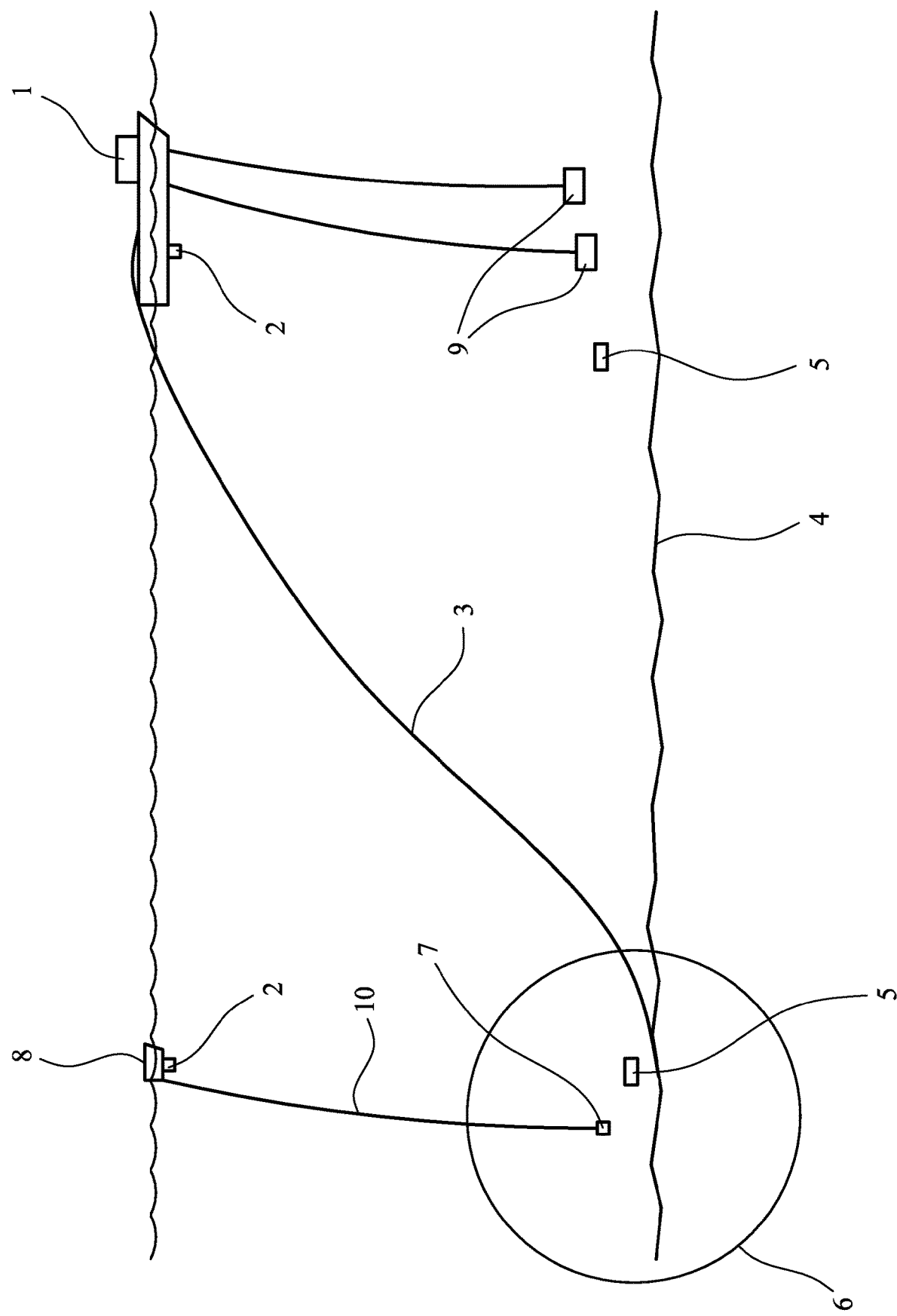

SYSTEM FOR MONITORING A REMOTE UNDERWATER LOCATION

RELATED APPLICATIONS

This application is a 35 U.S.C. 371 national stage filing from International Application No. PCT/GB2014/052860, filed Sep. 19, 2014, which claims priority to British Application No. 1316919.8, filed Sep. 23, 2013, the teachings of which are incorporated herein by reference.

The present invention is concerned with a system for monitoring a remote underwater location using an unmanned underwater vehicle or the like. Particular embodiments of the present invention are particularly advantageous for monitoring the touchdown point in underwater pipe laying with an underwater vehicle which moves autonomously to near the touchdown point but can then be operated remotely at or near the touchdown point. The touchdown point or area in underwater pipe-laying is the area at which the section of pipe being fed out from the back of a pipe-laying barge contacts the seabed as the pipe is laid.

When laying underwater pipes or cables, it is necessary to monitor the touchdown point at which the cable being laid touches on the seabed. It is important to monitor the pipe as it is laid so as to know if the pipe is being laid badly or in the wrong location or in a manner which increases the risk of breakage or does not allow for access at a later time for maintenance work. Monitoring the pipe as it touches down allows the pipe laying team to decide if there is preventative action they should or can take.

The monitoring of the touchdown area is typically done using cameras and sonar mounted on an ROV (remotely operated vehicle). An ROV is a remotely operated vehicle controlled by an operator on, for example, the pipe-laying vessel. The ROV is connected back to a mother ship or location via an umbilical which includes power and communication cables. ROVs typically do not have their own power supply but are supplied with power via the umbilical. Such umbilical power cables are heavy. There is in fact a vicious circle as the heavier the umbilical, the more power is required to move the ROV and hence the larger the diameter (and weight) of cable that is required.

The necessary umbilical cables would be particularly long, heavy and liable to tangle where the touchdown point is a significant distance (because, for example, the pipe is being laid in deep water) from the pipe-laying barge on which the ROV operator is based as a significant length of umbilical is required. Therefore there are clear advantages to, if possible, avoiding the need for an ROV with an umbilical when monitoring the touchdown point in deep water pipe laying.

In deep water where the touchdown point is a long distance from the pipe-laying vessel, it is not desirable to have an ROV with an extremely long umbilical back to the pipe-laying vessel. In deep water, the touchdown point may be 1 to 2 kilometres away from the pipe laying vessel (when measured in a direction parallel to the water surface) and of course much longer when one considers the actual distance from the pipe laying ship to the touchdown area deep underwater.

This means that for deep-water pipe-laying it is often necessary to have a dedicated ship (separate from the pipe laying vessel) to monitor the touchdown, and act as a mother ship for the ROV which is underwater doing the monitoring. However, even with such a mother ship for the ROV located remote from the pipe-laying vessel and closer to the touchdown point, the length of umbilical in deepwater pipe laying is still sufficient for a heavy umbilical to be necessary for an ROV monitoring the touchdown area. The umbilical for deep water touchdown monitoring may weigh 5 to 10 tonnes even when it runs back to a touchdown monitoring ship at the surface above the touchdown area rather than back to the pipe laying vessel itself. Umbilicals of such a weight require a large dedicated vessel for their storage and deployment and the provision of such a dedicated vessel to support the pipe-laying vessel greatly increases the cost of pipe-laying. The provision of a suitable dedicated ROV mother ship or control vessel may cost £75,000 to 150,000 per day. The need for such a ship therefore greatly increases the cost of deepwater pipe laying.

The present invention provides a system for monitoring a remote underwater location, the system including: an unmanned surface vessel, a communication unit for submerged location connected to the unmanned surface vessel, wherein the unmanned surface vessel has a position tracking and control system for controlling the position of the unmanned surface vessel on a body of water and relative to the unmanned underwater vehicle; the communication unit has a first wireless communication arrangement for communication with the unmanned underwater vehicle, and a second wired communication arrangement for communication with the unmanned surface vessel, and the unmanned surface vessel has a third communication arrangement for communication with an operator or observer remote from the unmanned surface vessel and the unmanned underwater vehicle, wherein the three communication arrangements are arranged in series such that, in use, the operator or observer may communicate with the unmanned/autonomous underwater vehicle via the unmanned surface vessel, the wired connection between the unmanned surface vessel and the communication unit, and the wireless connection between the communication unit and the unmanned underwater vehicle.

The inventor of the current invention has appreciated that it is possible to eliminate the need for a dedicated and expensive touchdown monitoring ship and use a smaller lower cost unmanned surface vehicle (USV) instead of the larger conventional and expensive support ship, by providing the communications system of claim 1.

Preferably the control system is for communicating with and/or controlling an autonomous underwater vehicle. The expression autonomous underwater vehicle (AUV) is used typically, and in this application, to describe a vehicle which can be programmed to travel between locations without operator input as it travels. The subject invention allows one to produce what is effectively a hybrid AUV/ROV system in that the vehicle can autonomously move or be deployed (i.e. without remote control as it so moves) to the vicinity of the location to be monitored, but once at that location can be remotely controlled via the communications unit. Autonomous underwater vehicles (AUVs) have previously not been used for monitoring touchdown as they have been unable to communicate the necessary information through water back the relatively long distances to the pipe laying vessel. The subject invention now allows one to use AUVs where previously the more expensive and complicated ROVs with their heavy umbilicals were required. This has clear cost, deployment and operational advantages.

Preferably the communications system is for monitoring the pipe touchdown point during underwater pipe or cable laying. The system does away with the need for heavy umbilicals with their attendant disadvantages.

Preferably, the control system is for controlling an unmanned underwater vehicle with an on board power supply. The provision of an on board power supply eliminates the need for a power umbilical connected to the underwater vehicle.

Preferably the first wireless communication arrangement is an optical communication arrangement. Optical communication arrangements can allow for high band width communication through water at distances of 100 m to 150 m in deepwater, and 200 m in ultra clear water. Optical communication systems using bright LEDS turned on and off extremely quickly to represent 1 and 0 and thereby digitally send information can transmit data up to 200 times faster than acoustic systems can although they can only do so over shorter distances. Underwater optical laser communications systems using blue-green lasers are also known and capable of transmitting 1 to 100s of Mbps through water.

Preferably, the unmanned surface vehicle includes a position tracking system for tracking the unmanned underwater vehicle and an autopilot arrangement for automatically controlling movement of the unmanned surface vehicle in response to movement of the unmanned underwater vehicle. This arrangement means that the unmanned surface vehicle and the communications unit connected to it will remain in positions to ensure that there is effective communication between the unmanned underwater vehicle and the operator or observer.

The present invention also provides a method of monitoring a remote underwater location using an unmanned underwater vehicle, including the steps of: deploying an unmanned surface vessel from the first manned vessel to a location remote from the first manned vessel; deploying an underwater communications unit from the unmanned surface vessel; deploying an unmanned underwater vehicle to a first starting or standby location in the vicinity of the first manned vessel; guiding the unmanned underwater vessel from the first starting or standby location to a second location in the vicinity of the underwater communications unit where the unmanned underwater vehicle and communicate can communicate using a wireless high band width communications system; communicating with and controlling the unmanned underwater vehicle from the first unmanned vessel, when the unmanned underwater vehicle is in the vicinity of the communications unit, via the wireless high band width communications system.

Preferably the high band width communications system is an optical communications arrangement. As discussed above, optical communication systems using bright LEDS turned on and off extremely quickly to represent 1 and 0 and thereby digitally send information can transmit data up to 200 times faster than acoustic data transfer arrangement systems. There should be sufficient band width for transmitting real time video of reasonable quality. The inventor has appreciated that a system using bright LEDs transmits up to 5 Mbps and that is enough band width for transmitting real time video of sufficient quality. A few Mbps is enough band width.

A preferred embodiment of the present invention will now be described by way of non-limiting example with reference to FIG. 1 which illustrates a touchdown monitoring arrangement including a preferred embodiment of the present invention.

Referring to FIG. 1, a pipe laying vessel 1 with an acoustic tracking system 2 has pipe 3 being laid from its rear deck in the known manner (see, for example, U.S. Pat. No. 5,452,507). Acoustic tracking systems for use in tracking underwater are well known to the skilled man and will therefore not be described further. The touchdown of that pipe 3 on the seabed 4 is monitored by an autonomous underwater vehicle 5. An autonomous underwater vehicle (AUV) is a robot which travels underwater without requiring input from an operator and, typically, has its own onboard power supply. The autonomous underwater vehicle 5 located at or near the pipe touchdown area 6 communicates with a communication unit or pod 7 which is suspended from a winch on an unmanned surface vehicle 8. The unmanned surface vehicle has an autopilot navigation system allowing it to move itself to a pre-defined location, and to maintain such a position. The USV is also equipped with a remote control arrangement allowing an operator on the pipe laying vessel 1 to control the position of the USV and/or to programme the autopilot arrangement, as well as control the winch from which the communication unit 7 is suspended. The communications unit 7 can therefore be located at a desired underwater location by deployment of the USV to a particular location on the surface of a body of water and then the winching or suspension of the communications unit 7 at a defined depth at that location.

The unmanned surface vehicle and pipe laying vessel both have acoustic tracking systems 2 to track the AUV 5 and determine its location when it is in range of the respective acoustic tracking systems. The tracking system on the pipe laying vessel tracks the AUV when the AUV is in the region of the pipe laying vessel, and the tracking system on the USV tracks the AUV when it is in the region of the USV. An underwater garage 9 for the autonomous underwater vehicle 5 is suspended from the pipe laying vessel 1. In the arrangement shown in FIG. 1, two autonomous underwater vehicles 5 and corresponding garages 9 are provided so that one underwater vehicle can be garaged and charged while the other is monitoring the touchdown location 6. The garages may also have acoustic tracking systems to track the AUV when it is their vicinity.

A suitable AUV may be the Sabretooth AUV available from Saab Seaeye Limited. Sabretooth is a trade mark of Saab Seaeye Limited. Such AUVs have an onboard battery to provide power for about twenty hours at slow speeds. The Sabretooth AUV has a hovering capability with cameras and sonar to monitor the area around the AUV. A high band width optical communication arrangement is provided allowing communication between the AUVs 5 and the communication unit 7 when they are within about 100 metres of each other. The AUVs 5 are also provided with auto-pilot control and acoustic position tracking arrangements so that an operator on the pipe laying vessel can track the AUVs.

Underwater optical communications systems using bright LEDs, or blue-green lasers are known. The laser arrangements allow for higher band width communication than the LED arrangements but are more expensive (and typically used in military applications). The cheaper LED arrangements provide sufficient band width (a few Mbps) for real time video transmission of reasonable quality and are therefore preferred for touchdown monitoring.

As mentioned above, the communication unit or pod 7 is suspended from the unmanned surface vehicle 8. The USV 8 has an auto-pilot navigation arrangement and can be remotely controlled from the pipe laying vessel or barge. The acoustic positioning system on the USV and auto-pilot navigation can be used to locate the USV above the approximate touchdown point. The communication unit can then be dropped by winch to within about 100 metres of the touchdown point 6 and monitoring location for the AUV.

The optical communication system for communication between the communication unit 7 and AUV 5 allows for wireless high band width communication between the AUV and the communication unit when these are close to each other (perhaps 50 to 150 m apart). The arrangement shown in FIG. 1 then allows for high band width control and communication between an operator on the pipe laying vessel 1 and the AUV 5 via wireless communication through the air above the water surface between the pipe laying vessel 1 and USV 8, then through a wired communication inside the cable 10 between the USV 8 and communication unit 7 and thence via the optical communication between the communication unit 7 and the AUV 5 through the water and across the relatively short distance between the communication unit 7 and AUV 5 at the touchdown location 6. Communication and information also flows in the opposite direction from the AUV 5 (collected, for example, from cameras and sonar mounted on the AUV and monitoring the touchdown) to the pipe laying vessel 1. Enabling such back-and-forth communication between the USV 8 and AUV 5, the communication unit 7 would be recognized as at least a transceiver.

The location of the AUVs 5 is monitored by one or more of the acoustic tracking systems 2 on the underside of the pipe laying vessel, underside of the USV, the AUV garages or on the AUVs themselves.

Each of the AUV garages 9 has an optical communication unit similar to that on the communication pod for communication with an AUV when it is in the vicinity of the garage. This enables real time control of the AUV by an operator for docking and operation near the garage. The garages include acoustic communication with the operator and auto-pilot control to maintain separation between the garages and to help the docking of an AUV in its respective garage. The garages may also be provided with sonar and cameras, and/or a heave compensation arrangement, to ease or aid docking.

The preferred embodiment described above uses optical communication in the vicinity of the garages and touchdown area for the communication of the large amount of information (i.e. high band width) necessary for control and observation at those points. Other communications arrangements (including radio and acoustic communication arrangements) which allow for the transfer of sufficient information in real time may also be used.

The arrangement shown in FIG. 1 and described above is deployed for operation as follows.

Firstly, the unmanned support vehicle 8 is launched from the pipe laying vessel 1 and its autopilot set to move to and then maintain position at the surface approximately above the point of touchdown 6. The approximate touchdown position can be determined by the operators of the pipe laying vessel and depends on parameters such as the depth of the water, the weight of the pipe and the speed of the pipe laying vessel. The communication unit 7 is then dropped to a working depth (about 50 metres from the sea floor) where it is tracked by the acoustic position system 2 on the underside of the unmanned surface vehicle. The position of the USV 8 is then adjusted using the information supplied by the acoustic tracking system until the communication unit is within about 100 metres of the touchdown point.

Then, an AUV garage 9 with an AUV 5 inside it is launched from the pipe laying vessel 1 to a point 50-200 metres from the seafloor 4. The position of the garage 9 is tracked by an acoustic positioning system 2 on the pipe laying vessel or barge. The AUV is then programmed to go to a waypoint near the communication unit 7. When the AUV is launched, its navigation system is initialised with acoustic positioning data and during transit to the location unit touchdown point it is tracked using the acoustic tracking systems 2 on the pipe laying vessel, USV and garage when it is within their range. The waypoint data may be updated as needed.

When the AUV 5 is near the communication unit 7, high band width communication between the AUV and the communication unit is established using the optical link. The operator on the pipe laying vessel 1 can then take control of the AUV and is in communication with it via the communication unit and USV. Then, the operator on the pipe laying vessel 1 can pilot the AUV 5 to monitor touchdown. The USV 8 is under autopilot control and will follow the AUV 5 as this is moved by the operator. The AUV will then move as pipe is laid and the touchdown point moves. That movement is slow as the pipe is laid slowly. The USV will normally be on autopilot to follow the AUV. The autopilot must take into account the AUV movements in addition to the offset effects that sea current may have. The AUV may also be on autopilot. Since the whole operation is very slow it is likely to be in station keeping mode for periods.

The second garage 9 is launched from the pipe laying vessel 1 as the battery of the first AUV runs down. The second AUV is then launched in the same way as the first AUV to take over monitoring from the first AUV. For a Sabretooth AUV used for touchdown monitoring (and therefore only moving slowly) the battery life is such that the launch of the second AUV is 15-20 hours after the first has launched.

When the second AUV arrives at the touchdown point, then the first AUV is commanded to go to a waypoint near its garage and real time control by the operator is switched to the newly arrived second AUV which then goes into operation in the manner described above for the first AUV. When the first AUV arrives back near its garage, real time control of it is taken by the operator using optical communication with the garage. The first AUV is then docked in the garage assisted by onboard cameras and sailors on the vehicle and garage. The AUV can then be recharged in the garage using inductive power transfer until it is needed to replace the second AUV in operation. The provision of alternating AUVs allows for continuous monitoring of the touchdown or other remote underwater location.

The invention claimed is:

1. A pipe or cable underwater laying touchdown monitoring system for visually monitoring a touchdown location of a pipe or cable being laid on a bed under a body of water, the system including:
   a lone unmanned support vehicle with an autopilot for controlling position of the unmanned support vehicle on or above a surface of the body of water, the unmanned support vehicle having an acoustic positioning system; and
   a submergible transceiver having wired connection to and movable together with, yet positioned remotely from, the unmanned support vehicle, the acoustic positioning system used for tracking location of the submergible transceiver so as to be positioned in vicinity of the touchdown location,
   wherein the submergible transceiver upon being positioned in vicinity of the touchdown location can communicate wirelessly with an unmanned underwater vehicle at or near the touchdown location such that location information of the unmanned underwater vehicle communicated to the unmanned support vehicle via the submergible transceiver is usable for corresponding positioning of the unmanned support vehicle by the autopilot and hence positioning of the submergible transceiver coupled thereto, and such that real time video signals from a video camera mounted on the unmanned underwater vehicle are communicated to the unmanned support vehicle via the submergible transceiver and control signals to control, position and steer the unmanned underwater vehicle are transmittable from the unmanned support vehicle via the submergible transceiver; and wherein the unmanned support vehicle is equipped with a further transceiver so as to be in communication wirelessly with an operator or observer remote from the unmanned support vehicle such that the operator or observer can receive the real time video signals from the unmanned underwater vehicle by way of the submergible transceiver, the unmanned support vehicle, and the further transceiver, and the operator or observer can control, position, and steer the unmanned underwater vehicle by way of the further transceiver of the unmanned support vehicle and the submergible transceiver.

2. The system according to claim 1 further comprising the unmanned underwater vehicle, the unmanned underwater vehicle equipped with a video camera for monitoring, pipe or cable touchdown point during underwater pipe or cable laying.

3. The system according to claim 1 further comprising the unmanned underwater vehicle, the unmanned underwater vehicle being an autonomous unmanned underwater vehicle and the operator or observer capable via the further transceiver, unmanned support vehicle, and the wired connection to the submergible transceiver for at least one of being in communication with the autonomous vehicle and controlling the autonomous vehicle.

4. The system according to claim 1 further comprising the unmanned underwater vehicle, the unmanned underwater vehicle being a remotely operable vehicle, the operator or observer capable via the further transceiver, unmanned support vehicle, and the wired connection to the submergible transceiver for at least one of being in communication with the remotely operable vehicle and controlling the remotely operable vehicle.

5. The system according to claim 1 further comprising the unmanned underwater vehicle, wherein the unmanned underwater vehicle has an on board power supply.

6. The system according to claim 5 including a recharging point for recharging or replenishing the power supply of the unmanned underwater vehicle.

7. The system according to claim 6 further including a garage or dock for the unmanned underwater vehicle and wherein the garage or dock is deployable from a remote vessel, the remote vessel serving as a location for the operator or observer using the system.

8. The system according to claim 7 wherein the recharging point is on or in the garage or dock.

9. The system according to claim 7 wherein the garage or dock is equipped for tracking the unmanned underwater vehicle via use of acoustic communication.

10. The system according to claim 7 wherein the garage or dock is equipped for selective communication with the unmanned underwater vehicle via use of optical communication and acoustic communication.

11. The system according to claim 1 further comprising the unmanned underwater vehicle wherein the communication wirelessly between the submergible transceiver and the unmanned underwater vehicle consists of optical communication.

12. The system according to claim 11 wherein the optical communication involves use of LEDs to transmit information in a digital form.

13. The system according to claim 1 further comprising the unmanned underwater vehicle, wherein the communication wirelessly between the submergible transceiver and the unmanned underwater vehicle includes optical communication and acoustic communication for selective communication between the unmanned support vehicle and the unmanned underwater vehicle via the submergible transceiver.

14. The system according to claim 1 wherein the corresponding positioning of the unmanned support vehicle is automatic and in direct response to movement of the unmanned underwater vehicle.

15. The system according to claim 1 further comprising the unmanned underwater vehicle, wherein the unmanned underwater vehicle comprises a first unmanned underwater vehicle and further comprising a second unmanned underwater vehicle for alternate deployment thereof at or near same remote underwater location.

16. The system according to claim 1 wherein movement and positioning of the transceiver for the communication wirelessly with the unmanned underwater vehicle is correspondingly controllable via the unmanned support vehicle.

17. The system according to claim 1, wherein the submergible transceiver is configured so as to hang from the underside of the unmanned support vehicle.

18. A method of visually monitoring a touchdown location of a pipe or cable being laid on a bed under a body of water, including steps of:

deploying an unmanned support vehicle from a first manned location to a location remote from the first manned location, the unmanned support vehicle being equipped with an autopilot for controlling position of the unmanned support vehicle on or above a surface of a body of water, the unmanned support vehicle having an acoustic positioning system;

deploying a submergible transceiver from the unmanned support vehicle for submerged positioning, the transceiver having wired connection with the unmanned support vehicle and movable therewith, the acoustic positioning system used for tracking location of the submergible transceiver so as to be positioned in vicinity of the touchdown location;

deploying an unmanned underwater to the touchdown location where the unmanned support vehicle is configured for real time communication of video signals with the unmanned underwater vehicle via the submergible transceiver using a wireless high band width communication link; and communicating with the unmanned underwater vehicle from the unmanned support vehicle when the unmanned underwater vehicle is in the vicinity of the submergible transceiver via the wireless high band width link;

wherein the submergible transceiver can communicate wirelessly with the unmanned underwater vehicle such that location information of the unmanned underwater vehicle communicated to the unmanned support vehicle via the transceiver is usable for corresponding positioning of the unmanned support vehicle by the autopilot and hence of the submergible transceiver connected thereto; and wherein the unmanned support vehicle is equipped with further transceiver so as to be in communication wirelessly with an operator or observer remote from the unmanned support vehicle and the unmanned underwater vehicle such that the operator or observer can receive real time video signals from the video camera from the unmanned underwater vehicle by way of the submergible transceiver, the unmanned support vehicle, and the further transceiver.

19. The method according to claim 18 wherein the communication via the high band width communications link is optical communication.

20. The method according to claim 18 wherein the submergible transceiver is configured so as to hang from the underside of the unmanned support vehicle.

21. The method according to claim 18, wherein the unmanned underwater vehicle is deployed from a vessel or garage, the vessel or garage having an acoustic positioning system for tracking location of the unmanned underwater vehicle so as to be positioned in vicinity of the touchdown location.

22. A pipe or cable underwater laying touchdown monitoring system for visually monitoring a touchdown location of a pipe or cable being laid on a bed under a body of water, the system including:
  a lone unmanned support vehicle with an autopilot for controlling position of the unmanned support vehicle on or above a surface of the body of water, the unmanned support vehicle having an acoustic positioning system; and
  a submergible transceiver having wired connection to and movable together with, yet positioned remotely from, the unmanned support vehicle, the acoustic positioning system used for tracking location of the submergible transceiver so as to be positioned in vicinity of the touchdown location:
  an autonomous unmanned underwater vehicle equipped with an on-board power supply and programmable to autonomously position itself, based on signals obtained from the submergible transceiver, to a selected location within an effective range of the submergible transceiver and within the vicinity of the touchdown location;
  wherein the submergible transceiver when positioned in the vicinity of the touchdown location can communicate wirelessly with the unmanned underwater vehicle when at or near the touchdown location such that location information of the unmanned underwater vehicle when transmitted to the unmanned support vehicle via the submergible transceiver, is usable for corresponding positioning of the unmanned support vehicle by the autopilot and hence positioning of the submergible transceiver coupled thereto, whereby real time image signals from a camera mounted on the unmanned underwater vehicle are transmittable to the unmanned support vehicle via the submergible transceiver and control signals to control, position and steer the unmanned underwater vehicle are transmittable from the unmanned support vehicle via the submergible transceiver.

23. The system according to claim 22, wherein the unmanned support vehicle is equipped with a further transceiver so as to be in communication wirelessly with an operator or observer remote from the unmanned support vehicle such that the operator or observer can receive the real time image signals from the unmanned underwater vehicle by way of the submergible transceiver, the unmanned support vehicle, and the further transceiver, and the operator or observer can control, position, and steer the unmanned underwater vehicle by way of the further transceiver of the unmanned support vehicle and the submergible transceiver.

24. The system according to claim 22, further comprising a vessel or garage from which the unmanned underwater vehicle is deployable, the vessel or garage having an acoustic positioning system used for tracking location of the unmanned underwater vehicle so as to be positioned in vicinity of the touchdown location.

* * * * *